United States Patent
Pane et al.

(10) Patent No.: US 11,619,534 B2
(45) Date of Patent: Apr. 4, 2023

(54) SYSTEM AND METHOD FOR MEASURING SATURATED STEAM FLOW USING REDUNDANT MEASUREMENTS

(71) Applicant: Honeywell International Inc., Morris Plains, NJ (US)

(72) Inventors: Joseph Pane, North Wales, PA (US); Usha Kuloor, North Wales, PA (US); Siva Sagar Kuricheti, Hyderabad (IN); Augustene Manohar Shyam Pasala, Hyderabad (IN)

(73) Assignee: Honeywell International Inc., Charlotte, NC (US)

( * ) Notice: Subject to any disclaimer, the term of this patent is extended or adjusted under 35 U.S.C. 154(b) by 938 days.

(21) Appl. No.: 16/380,949

(22) Filed: Apr. 10, 2019

(65) Prior Publication Data
US 2020/0326220 A1 Oct. 15, 2020

(51) Int. Cl.
*G01F 15/04* (2006.01)
*G01F 1/74* (2006.01)
(Continued)

(52) U.S. Cl.
CPC ............ *G01F 15/043* (2013.01); *G01F 1/74* (2013.01); *G01F 1/80* (2013.01); *G01F 1/88* (2013.01); *G06F 9/3004* (2013.01)

(58) Field of Classification Search
None
See application file for complete search history.

(56) References Cited

U.S. PATENT DOCUMENTS 6,170,338 B1   1/2001  Kleven et al.
6,182,019 B1 * 1/2001  Wiklund ............... G01F 15/063
                                          702/100
(Continued)

FOREIGN PATENT DOCUMENTS

EP   0717869 B1   2/2000

OTHER PUBLICATIONS

Search Report for corresponding EP Application No. 20166071.9.
(Continued)

*Primary Examiner* — Harshad R Patel
(74) *Attorney, Agent, or Firm* — Ortiz & Lopez, PLLC; Kermit D. Lopez; Luis M. Ortiz (57) ABSTRACT

A system and method for measuring a flow of saturated steam can include a temperature sensor that measures process temperature, and one or more pressure sensors that measure pressure including differential pressure and static pressure. A flow of saturated steam can be calculated from two sets of measurements, one measurement using the differential pressure and the static pressure and a second measurement using the differential pressure and the process temperature. Redundant flow measurements can be provided with respect to the flow of saturated steam in case of failure of the temperature sensor or the pressure sensors. In addition, a deviation between the flow of the saturated steam as calculated from the process temperature and the differential pressure compared to a flow of saturated steam as calculated from the differential pressure and the static pressure can provide an indication of degradation of the temperature sensor or the pressure sensors.

20 Claims, 6 Drawing Sheets

(51) Int. Cl.
    *G01F 1/80*     (2006.01)
    *G01F 1/88*     (2006.01)
    *G06F 9/30*     (2018.01)

(56) References Cited

U.S. PATENT DOCUMENTS

| | | | |
|---|---|---|---|
| 6,615,090 B1 | 9/2003 | Blevins et al. | |
| 8,136,414 B2* | 3/2012 | Steven | G01F 1/88 |
| | | | 73/861.63 |
| 8,849,589 B2* | 9/2014 | Wiklund | G01F 1/363 |
| | | | 702/50 |
| 8,984,641 B2 | 3/2015 | Tandon et al. | |
| 9,347,847 B2 | 5/2016 | Hershey | |
| 9,904,296 B2 | 2/2018 | Peczalski et al. | |
| 10,180,450 B1 | 1/2019 | Beeram et al. | |
| 2007/0244654 A1 | 10/2007 | Ito et al. | |
| 2013/0327018 A1 | 12/2013 | Tylutki et al. | |
| 2017/0023393 A1* | 1/2017 | Wiklund | G01F 15/04 |
| 2018/0172495 A1 | 6/2018 | Parry et al. | |
| 2019/0025776 A1 | 1/2019 | Bhattacharya et al. | |
| 2019/0025809 A1 | 1/2019 | Bhattacharya et al. | |

OTHER PUBLICATIONS

"The ISA100 Standards, Overview & Status", ISA 2008, Research Triangle Park, NC.
"Foundation Fieldbus Overview", National Instruments, Jan. 2014.
"Digital Yewflo Vortex Flowmeters", Yokogawa Corporation of America, 2006.
"Monitoring Energy Flows for Saturated and Superheated Steam or Hot Water", Modern Pumping Today, Jun. 2015.

\* cited by examiner

SYSTEM AND METHOD FOR MEASURING SATURATED STEAM FLOW USING REDUNDANT MEASUREMENTS

TECHNICAL FIELD

Embodiments are generally related to devices and systems that measure the flow of a fluid, and in particular, the flow of saturated steam. Embodiments also relate to flow measuring systems and multi-variable transmitters used in flow measuring systems.

BACKGROUND

Industrial multi-variable transmitters can be used to measure the flow of a fluid. Measuring the flow of saturated steam is a specific application where multi-variable transmitters can be used. Multi-variable transmitters offer a less expensive alternative compared to other measuring technologies (e.g., vortex flowmeters).

Sensors may degrade or fail over time due to the effects (e.g., pressures and temperatures) of the process fluids and the environments in which they are used for industrial applications. When a sensor degrades, the calculated flow error can increase. When the sensor fails, the calculated flow may not be available. When the calculated flow output is not available or not current, the other applications that rely on the sensor can be adversely affected, whether for control, inventory management, or other purposes.

BRIEF SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

It is, therefore, one aspect of the disclosed embodiments to provide for an improved flow measuring system and method.

It is another aspect of the disclosed embodiments to provide an improved multi-variable transmitter for use in measuring the flow of a fluid and in particular saturated steam flow.

It is another aspect of the disclosed embodiments to provide for a flow measuring system and method that operates with a degree of measurement redundancy in the event of a failure of one or more sensors.

It is a further aspect of the disclosed embodiments to provide for early sensor warning diagnostics for a flow measuring system based on a calculated deviation.

The aforementioned aspects and other objectives can now be achieved as described herein.

In an embodiment, a system for measuring a flow of saturated steam, can include a temperature sensor that measures a process temperature, and at least one pressure sensor that measures pressure including a differential pressure and a static pressure, wherein two sets of measurements can be used to calculate a flow of saturated steam, wherein a first set of measurements among the two sets of measurements uses the differential pressure and the static pressure to calculate the flow of saturated steam and a second set of measurements among the sets of measurements uses the differential pressure and the process temperature to calculate the flow of saturated steam. The system can be configured to provide redundant flow measurements with respect to the flow of the saturated steam in case of a failure of either the temperature sensor or the static pressure sensor.

In an embodiment, a deviation between a flow of the saturated steam as calculated from the process temperature and the differential pressure compared to a flow of the saturated steam as calculated from the differential pressure and the static pressure can provide an indication of a degradation of at least one of: the temperature sensor and the at least one pressure sensor.

In an embodiment, the deviation can comprise an early indicator for calibration of either the temperature sensor or the at least one pressure sensor.

In an embodiment, a quality status regarding which of the redundant flow measurements can be output with respect to the flow of the saturated steam.

In an embodiment a quality status can be output regarding at least one of the differential pressure and the process temperature measured to calculate the flow of the saturated steam, and the differential pressure and the static pressure measured to calculate the flow of the saturated steam.

In an embodiment, the system can include at least one of a multi-variable transmitter, a field mounted device, an RTU (Remote Terminal Unit), a PLC (Programmable Logic Controller), and a DCS (Distributed Control System).

In an embodiment, a system for measuring a flow of saturated steam, can include at least one processor, and a non-transitory computer-usable medium embodying computer program code, the computer-usable medium capable of communicating with the at least one processor. The computer program code can include instructions executable by the at least one processor and configured for: measuring a process temperature with a temperature sensor, and measuring with at least one pressure sensor, a pressure including a differential pressure and a static pressure, wherein two sets of measurements are used to calculate a flow of saturated steam, wherein a first set of measurements among the two sets of measurements uses the differential pressure and the static pressure to calculate the flow of saturated steam and a second set of measurements among the sets of measurements uses the differential pressure and the process temperature to calculate the flow of saturated steam, wherein the system is configured to provide redundant flow measurements with respect to the flow of the saturated steam in case of a failure of either the temperature sensor or the static pressure sensor.

In an embodiment, the instructions can be further configured for determining a deviation between a flow of the saturated steam as calculated from the process temperature and the differential pressure compared to a flow of the saturated steam as calculated from the differential pressure and the static pressure provides an indication of a degradation of at least one of: the temperature sensor and the at least one pressure sensor.

In an embodiment, a method for measuring a flow of saturated steam, can include the steps of measuring a process temperature with a temperature sensor, and measuring with at least one pressure sensor, a pressure including a differential pressure and a static pressure, wherein two sets of measurements are used to calculate a flow of saturated steam, wherein a first set of measurements among the two sets of measurements uses the differential pressure and the static pressure to calculate the flow of saturated steam and a second set of measurements among the sets of measurements uses the differential pressure and the process temperature to calculate the flow of saturated steam. Redundant flow measurements are thus provided with respect to the flow of the saturated steam in case of a failure of either the temperature sensor or the static pressure sensor.

In an embodiment, the method can further include the step of determining a deviation between a flow of the saturated steam as calculated from the process temperature and the differential pressure compared to a flow of the saturated steam as calculated from the differential pressure and the static pressure provides an indication of a degradation of at least one of: the temperature sensor and the at least one pressure sensor.

In an embodiment of the method, the deviation can comprise an early indicator for calibration of either the temperature sensor or the at least one pressure sensor.

In an embodiment, the method can further include the step of generating a quality status regarding which of the redundant flow measurements is output with respect to the flow of the saturated steam.

In an embodiment, the method can further include the step of generating a quality status regarding the differential pressure and the process temperature measured to calculate the flow of the saturated steam.

In an embodiment, the method can further include the step of generating a quality status regarding the differential pressure and the static pressure measured to calculate the flow of the saturated steam.

In an embodiment, the method can further include the step of generating a quality status regarding at least one of: the differential pressure and the process temperature measured to calculate the flow of the saturated steam; and the differential pressure and the static pressure measured to calculate the flow of the saturated steam.

In an embodiment, the method can further include the step of measuring the process temperature with the temperature sensor, the step of measuring with the at least one pressure sensor, the pressure including the differential pressure and the static pressure, and the step of determining the deviation between the flow of the saturated steam as calculated from the process temperature and the differential pressure compared to the flow of the saturated steam as calculated from the differential pressure and the static pressure to provide an indication of the degradation of at least one of the temperature sensor and the at least one pressure sensor, can be performed in least of one of: a multi-variable transmitter, a field mounted device, an RTU (Remote Terminal Unit), a PLC (Programmable Logic Controller), and a DCS (Digital Control System).

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other issues, subject matter may be embodied as methods, devices, components, or systems. Accordingly, embodiments may, for example, take the form of hardware, software, firmware, or a combination thereof. The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Some multi-variable transmitters can measure differential pressure (DP) and static pressure (SP) to calculate the flow of saturated steam (this method will be referred to as "Option A" in this disclosure). Other multi-variable transmitters can measure differential pressure (DP) and process temperature (PT) to calculate the flow of saturated steam (this approach will be referred to as "Option B" in this disclosure). Some multi-variable transmitters allow a user to select either Option A or Option B to calculate the saturated steam flow. Other multi-variable transmitters may only support one of these two options due to the sensors used. In Option A, if the SP sensor degrades or fails, the calculated flow output may be either less accurate or unavailable, respectively. In Option B, if the PT sensor degrades or fails, the calculated flow output may be either less accurate or unavailable, respectively.

Figure 1:
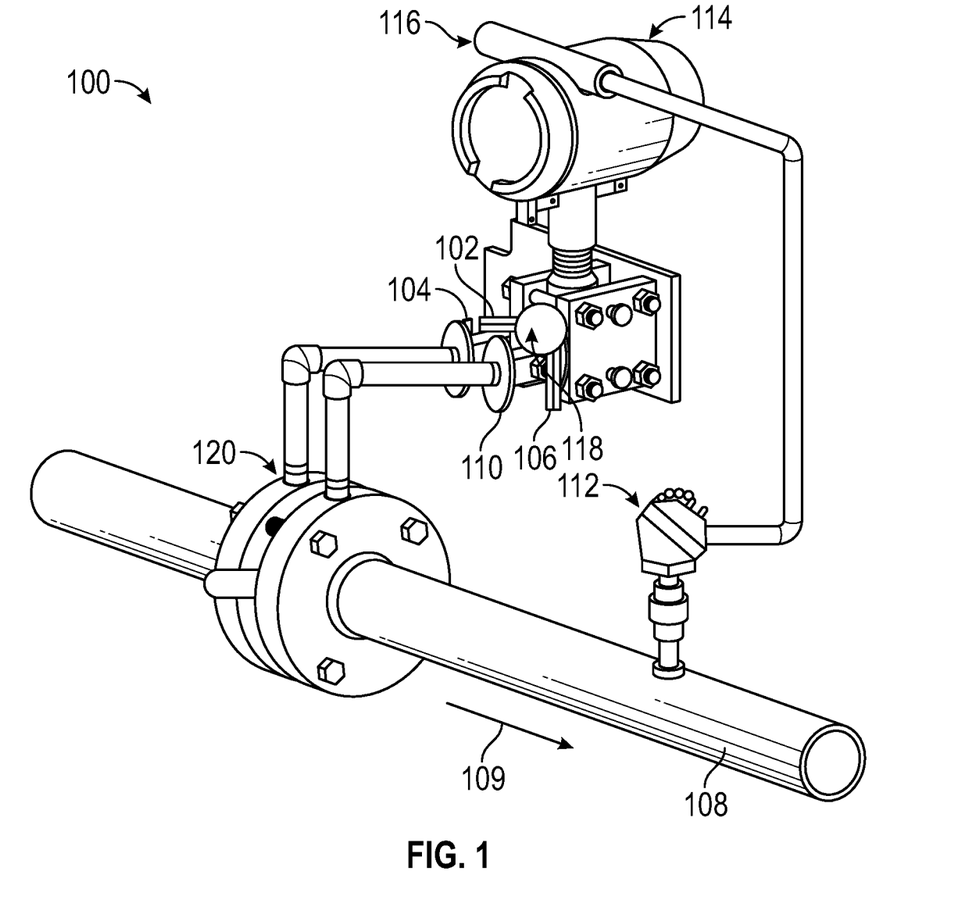
FIG. 1 illustrates a pictorial diagram of a system for measuring flow in accordance with an embodiment.

FIG. 1 illustrates a pictorial diagram of a system 100 for measuring flow, which can be configured to include a multi-variable transmitter 114, in accordance with an embodiment. The multi-variable transmitter 114 of the system 100 depicted in FIG. 1 can be utilized to measure the flow of a fluid, and in particular, the flow of saturated steam. The multi-variable transmitter 114 can include a temperature sensor 112 (e.g., a PT sensor), which may be, for example, an RTD (Resistance Temperature Detector) sensor, or a TIC (Thermocouple), thermocouple and RTD sensor, and can be of any IEC standard sensor or GOST standard sensor. The multi-variable transmitter 114 can further include a pressure meter body 118, a three valve-manifold 110, a first valve 104, a second valve 102, and a third valve 106.

Figure 5:
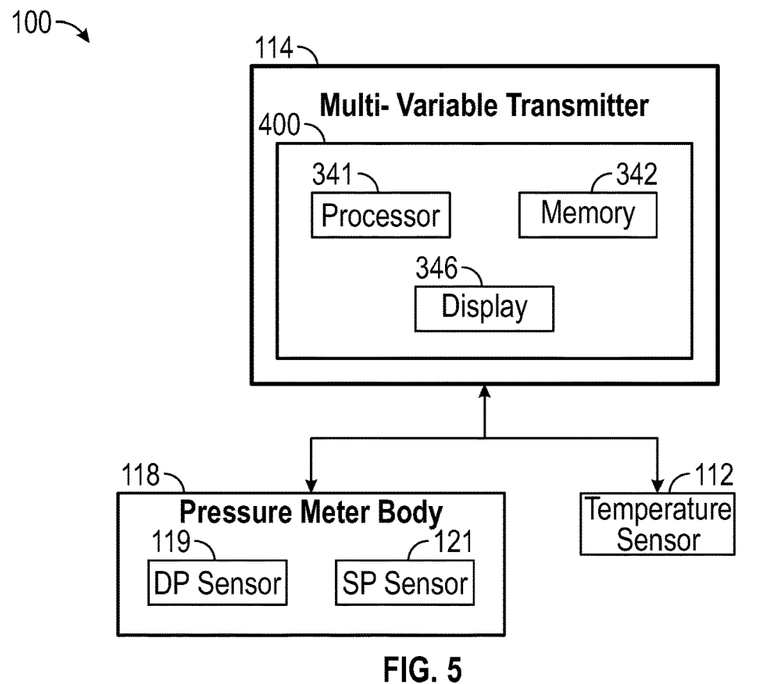
FIG. 5 illustrates a block diagram depicting aspects of a system for measuring flow including a multi-variable transmitter, in accordance with an embodiment.
Figure 6:
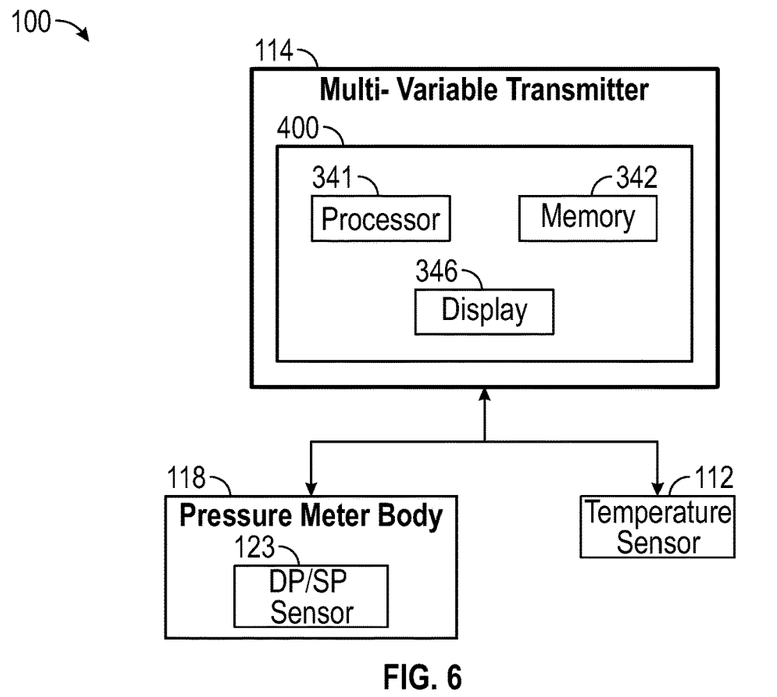
FIG. 6 illustrates a block diagram depicting aspects of a system for measuring flow including a multi-variable transmitter, in accordance with an alternative embodiment.

As will be discussed in further detail herein, one or more pressure sensors can be located within the pressure meter body 118. In an embodiment, the pressure meter body 118 can contain one or more pressures sensors, such as an SP (Static Pressure) sensor and a DP (Differential Pressure) sensor. In another embodiment, a single pressure sensor can be implemented in the pressure meter body 118, which measures both SP and DP. FIG. 5, for example, depicts a DP sensor 119 and an SP sensor 121 contained within the pressure meter body 118. FIG. 6, for example, depicts a single DP/SP sensor 123 contained within the pressure meter body 118.

In either case, a pressure sensor contained within the pressure meter body 118 can be configured to measure the pressure of a fluid, which can assist in providing an indication of the flow of saturated steam. Such a pressure sensor can be a differential pressure sensor and a static pressure sensor, and can comprise a diaphragm-based piezoresistive, capacitance, or other known type of pressure sensor.

Note that an RTD sensor is a type of temperature sensor that can contain a resistor that changes resistance value as its temperature changes. A T/C sensor is a type of temperature sensor based on a thermocouple that includes at least two dissimilar electrical conductors that form electrical junctions at different temperatures. A thermocouple can produce a temperature-dependent voltage as a result of the thermoelectric effect, and this voltage can be interpreted to measure temperature in the context of a T/C sensor. An RTD sensor or a T/C sensor can be any type of IEC (International Electrotechnical Commission) standard sensor or GOST standard sensor. It should be appreciated that the disclosed embodiments are not limited to these specific types of temperature sensors, and that the aforementioned temperature sensor types are discussed herein for exemplary purposes only.

The system 100 can further include process connections 120 that can interface to both a high-pressure side and a low-pressure side of the pressure meter body 118. The multi-variable transmitter 114 can connect to a host system via a wired interface (e.g., with communications protocols such as HART (Highway Addressable Remote Transducer), FOUNDATION™ Fieldbus, or MODBUS®) or a wireless interface (e.g., such as ISA 100 or Wireless HART).

As utilized herein, HART or "Highway Addressable Remote Transducer" relates to a communication standard used in the process control industry, and can be referred to as the HART communication protocol, the HART protocol or simply HART. The HART protocol can support a combined digital and analog signal on a dedicated wire or set of wires, in which online process signals (e.g., such as control signals, sensor measurements, etc.) an be provided as an analog current signal (e.g., ranging from 4 to 20 milliamps) and in which other signals, such as device data, requests for device data, configuration data, alarm and event data, etc., can be provided as digital signals superimposed or multiplexed onto the same wire or set of wires as the analog signal.

The term FOUNDATION™ Fieldbus as utilized herein relates to the Foundation Fieldbus specification, which is an all-digital, serial two-way communications system that can server a base-level network in a plant or factory automation environment. FOUNDATION™ Fieldbus is an open architecture, developed and administered by FieldComm Group™. Note that FIELDBUS FOUNDATION™ and FOUNDATION™ are trademarks of the Fieldbus Foundation, which is responsible for the definition of the Foundation Fieldbus specification.

The term "MODBUS® as utilized herein relates to a digital communications protocol that allows controllers and devices (e.g., field devices) from different manufacturers to exchange data using standard formats. The MODBUS® protocol (also referred to simply as "Modbus") can define a message structure that controllers and other devices can recognize and use regardless of the types of networks over which they communicate—most typically RS-485 serial or Ethernet using TCP.

Note that the term "ISA 100" as utilized herein refers to a standard defining wireless systems for industrial automation and control applications including variations thereof (e.g., ISA100.11a, etc) released by the ISA (International Society of Automation).

The term "wireless HART" (also referred to as WirelessHART) as utilized herein can relate to a wireless mesh network communications protocol for process automation applications, which can add wireless capabilities to the wired HART protocol while maintaining compatibility with existing wired HART-enabled devices, commands and tools. A WirelessHART network can use, for example, IEEE 802.15.4 compatible radios operating in the 2.4 GHz radio band. Each device in a WirelessHART mesh network can serve as a router for messages from other devices. In other words, a device does not have to communicate directly to a gateway, but just forward its message to the next closest devices. This feature can extend the range of the WirelessHART network and provide redundant communications routes that increase network reliability.

The system 100 can further include a flow tube 108 through which a fluid flows in a direction indicated by arrow 109. The multi-variable transmitter 114 can further include a communications interface 116 (i.e., wireless or wired) to the host system. The pressure meter body 118 can contain both an SP sensor and a DP sensor. The flow tube 108 may be a fluid pipe or other process connection. The communications interface 116 can be implemented as an electronic circuit, which may be designed to a specific communications standard, which can allow one or more machines, devices or systems to telecommunication with one or more other machines, devices or systems.

The host system may be an industrial process control and automation system, and can include various components that facilitate production or processing of at least one product or other material. An industrial process control and automation system can be used to facilitate control over components in one or multiple plants including processing facilities and manufacturing facilities for producing at least one product or other material. In general, the host system may implement one or more processes and can be referred to as a process system. A process system generally represents any system or portion thereof configured to process one or more products or other materials in some manner.

As discussed previously, some multi-variable transmitters measure differential pressure and static pressure to calculate the flow of saturated steam. This approach will be referred to as "Option A" in this disclosure. Other multi-variable transmitters may measure differential pressure and process temperature to calculate the flow of saturated steam. This approach will be referred to as "Option B" in this disclosure. Some multi-variable transmitters allow a user to select either Option A or B to calculate the saturated steam flow. In Option A, however, if the SP sensor degrades or fails, the calculated flow output may be either less accurate or unavailable, respectively. In Option B, if the PT sensor degrades or fails, the calculated flow output may be either less accurate or unavailable, respectively.

Figure 2:
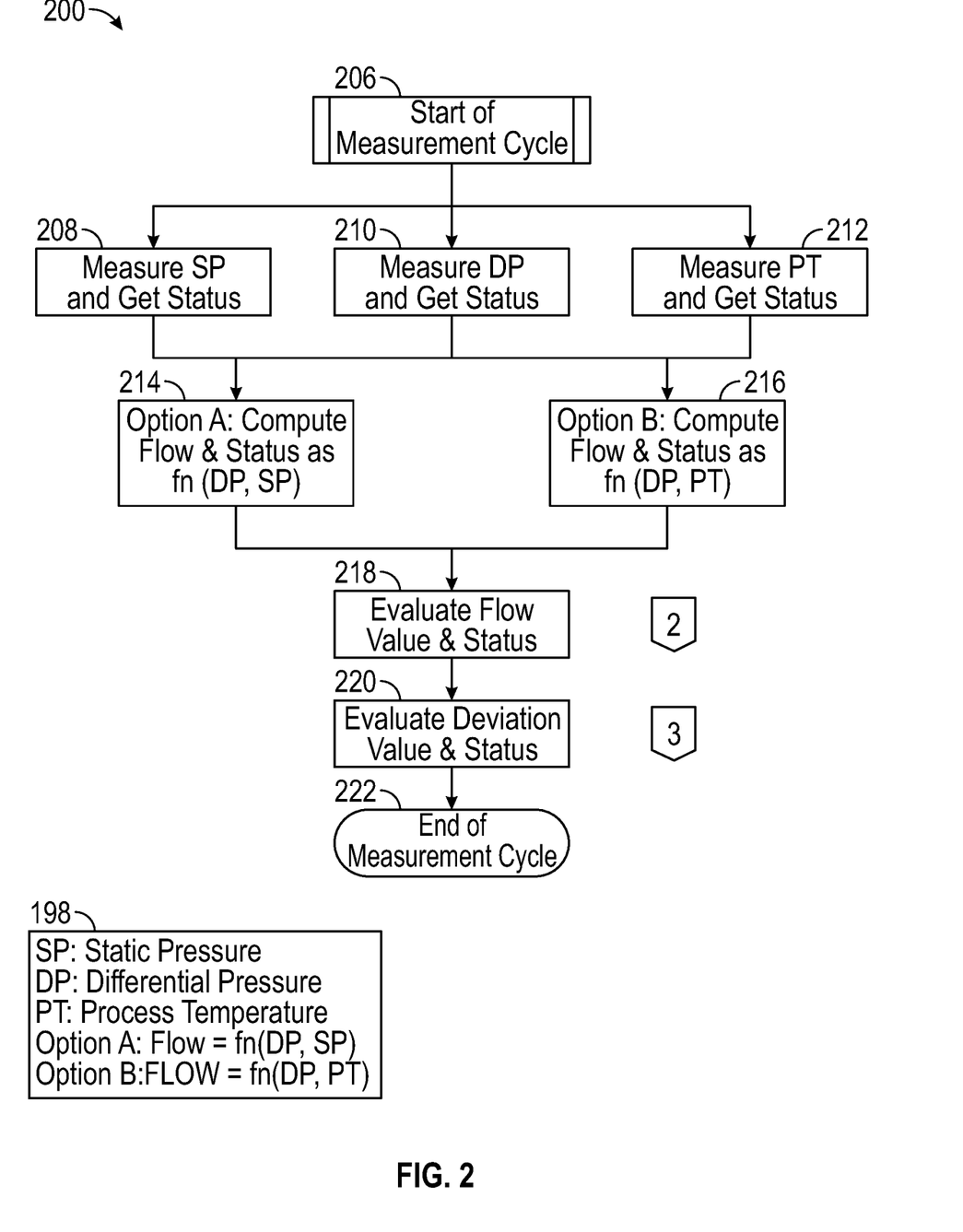
FIG. 2 illustrates a flow diagram depicting logical operational steps of a method of operating a multi-variable transmitter in a system for measuring flow, in accordance with an embodiment.

FIG. 2 illustrates a flow diagram depicting logical operational steps of a method 200 of operating the multi-variable transmitter 114, in accordance with an embodiment. A legend 198 shown in the lower left hand side of FIG. 2 includes a summary of various acronyms and terms, such as SP (Static Pressure), DP (Differential Pressure), PT (Process Temperature), and Option A and Option B as discussed previously. As indicated at block 206, a measurement cycle can begin with respect to the multi-variable transmitter 114. In the disclosed approach, the saturated steam flow is calculated from two sets of measurements, one using the differential pressure and static pressure and the second measurement using the differential pressure and process temperature. The system 100 is configured to provide redundant flow measurements with respect to the flow of the saturated steam in case of a failure of either the temperature sensor or the static pressure sensor.

During the measurement cycle, the SP can be measured and a status obtained, as shown at block 208. The DP can also be measured and a status obtained, as shown at block 210. The PT can also be measured and a status obtained, as shown as block 212. Thereafter, as shown at block 214, Option A can be implemented in which the flow and status are computed as a function of DP and SP (i.e. Flow=fn (DP, SP)). As depicted at block 216, Option B can be implemented, wherein flow and status are computed as a function of DP and PT (i.e. Flow=fn (DP, PT)).

Next, as illustrated at block 218, a step or operation can be implemented in which the flow (or FLOW) value and status are evaluated. Thereafter, as shown at block 220, a step or operation can be implemented in which a deviation value and status are evaluated. Thereafter, as shown at block 222, the measurement cycle can terminate.

Figure 3:
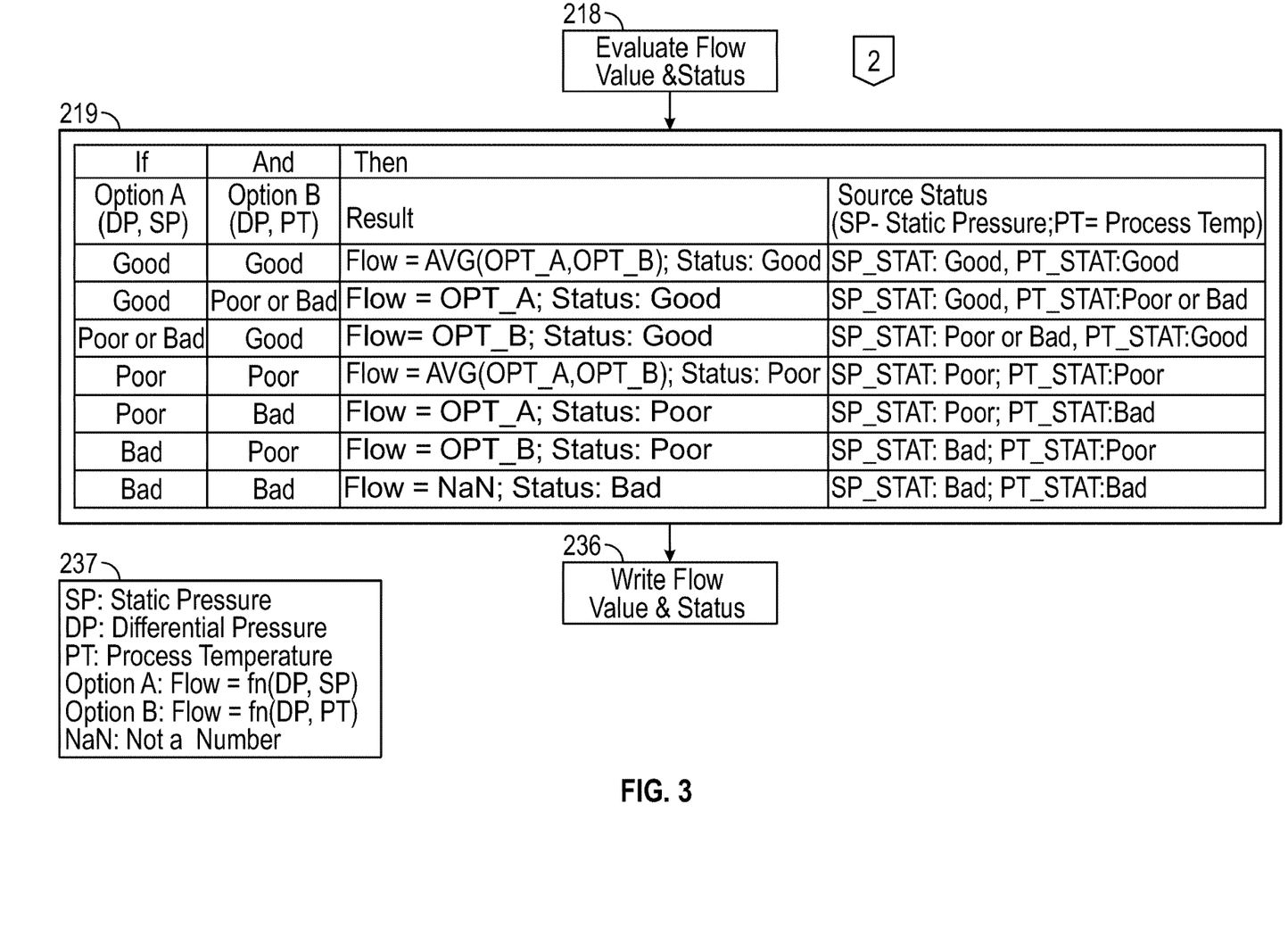
FIG. 3 illustrates a flow diagram depicting additional logical operational steps of a method of operating a multi-variable transmitter in a system for measuring flow, in accordance with an embodiment.

FIG. 3 illustrates a flow diagram depicting additional logical operational steps of a continuation of the method 200 of operating the multi-variable transmitter 114, in accordance with an embodiment. The steps or operations shown in FIG. 3 are associated with the evaluate FLOW and status operation shown at block 218 in FIG. 2. The legend 237 shown in FIG. 3 is similar to the legend 198 shown in FIG. 2. FIG. 3 thus represents a more detailed view of the operation depicted at block 218 in FIG. 3.

As shown at block 219 in FIG. 3, data can be obtained and arranged in a table that represents a decision that a method (e.g., an algorithm) can use to determine the best flow value, as a part of the evaluate FLOW value and status operation associated with block 218. Once such data is accumulated and analyzed, a FLOW value and status can be written as part of a 'write' operation, as shown at block 236.

Figure 4:
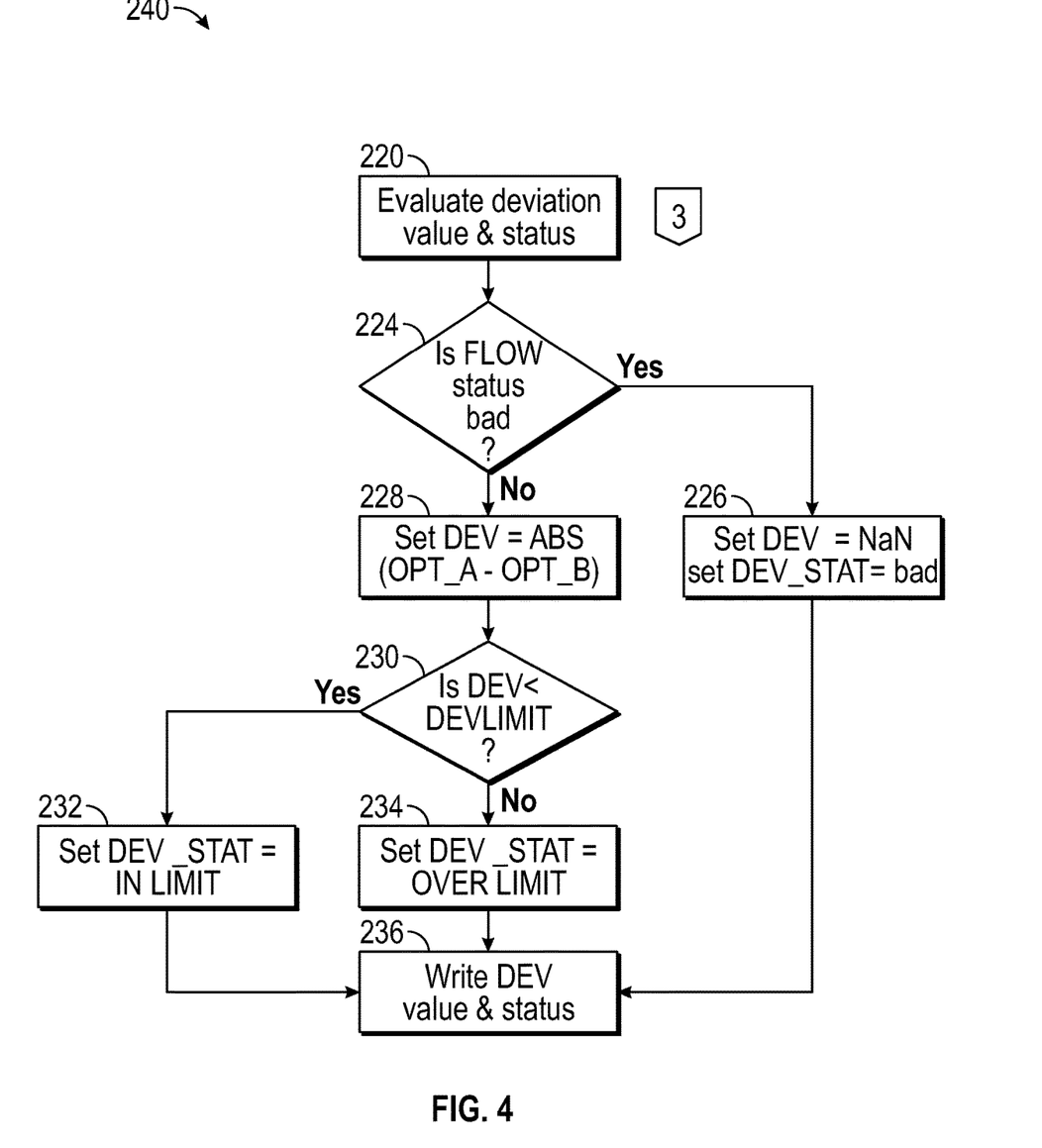
FIG. 4 illustrates a flow diagram depicting further logical operational steps of a method of operating a multi-variable transmitter in a system for measuring flow, in accordance with an embodiment.

FIG. 4 illustrates a flow diagram depicting further logical operational steps of a method 240 of operating a multi-variable transmitter, in accordance with an embodiment. The steps or operations shown in the various blocks in FIG. 4 present a more detailed view of the evaluate deviation value and status operation associated with block 220. Thus, as indicated at decision block 224, a step or operation can be implemented to determine if the flow status is "bad". If the answer is "Yes", then as shown at block 226 an operation can be implemented wherein "Set DEV=NaN" (Not a Number) and "Set DEV_STAT=Bad". Thereafter, the deviation value and status can be written, as shown at block 236. Note that "DEV" represents the term "deviation".

Assuming the answer with respect to decision block 224 is "No", then a step or operation can be implemented as indicated at block 228 wherein "Set DEV=ABS(OPT_A−OPT_B)". That is, a deviation can be found which is equivalent to the absolute value of the difference between the Option A and Option B results (i.e., OPT_A represents Option A and OPT_B represents Option B). Next, as shown at decision block 230, a step or operation can be implemented to determine if the deviation is greater than deviation limit. If yes, then as indicated at block 232, a step or operation can be implemented wherein "Set DEV_STAT=INLIMIT" followed by the write deviation value and status operation shown at block 236. Assuming that the answer with respect to the decision block 230 is "No", then a step or operation can be implemented as depicted at block 234 wherein "Set DEV_STAT=OVERLIMIT". Thereafter, the write DEV value and status operation can be implemented as shown at block 236.

The approach described above can leverage both Option A and Option B to provide a degree of measurement redundancy in the event to failure by either the PT sensor or the SP sensor. Since Option A and Option B both use DP, the disclosed approach should have a good DP measurement. Note that the temperature sensor 112 is not located in the pressure meter body 118. Only the SP sensor and the DP sensor are located in the pressure meter body 118.

A check for a deviation between the Option A calculation and the Option B calculation can be implemented to report early sensor warning diagnostics for the multi-variable transmitter 114. In addition, the disclosed approach can be used to maintain a current and accurate flow output in cases when either the temperature sensor 112 or SP sensor fails. Additionally, the disclosed approach can be implemented for early detection of degrading sensors, and also offers a less expensive alternative to vortex flowmeters or other more expensive flowmeters.

FIG. 5 illustrates a block diagram depicting aspects of the system 100 including the multi-variable transmitter 114, in accordance with an embodiment. As shown in FIG. 5, the multi-variable transmitter 114 can include a data-processing apparatus 400 that includes a processor 341, a memory 342, and a display 346. It can be appreciated that additional components may be included in data-processing apparatus 400 as may be needed. The processor 341 may be implemented as a microprocessor or a microcontroller or a combination of both a microprocessor and a microcontroller. The memory 342 can include a volatile memory or a non-volatile memory or a combination of a volatile memory and a non-volatile memory. For example, memory 342 may be implemented as not a single memory component but two or more memory devices or memory components. The display 346 can be implemented as a small display with, for example, several pushbuttons.

As discussed previously herein, the flow measuring system 100 can include a pressure meter body 118 that can contain one or more pressure sensors. As shown in the example embodiment depicted in FIG. 5, the pressure meter body 118 can contain both a DP sensor 119 and an SP sensor 121. The flow measuring system 100 additionally can include the temperature sensor 112, as discussed previously herein.

The processor 341 can access pressure data and temperature data stored in the memory 342. The processor 341 can receive an output from the DP sensor 119, an output from the SP sensor and an output from the temperature sensor 112. Although not shown, in some embodiments an analog-to-digital converter (ADC) can be located between the output of the DP sensor 119, an output from the SP sensor, and an output of the temperature sensor 112 and provide a digital signal to digital components such as processor 341 or other devices. Likewise, in other embodiments, a digital-to-analog converter (DAC) may be located between the output of processor 341 and the multi-variable transmitter 114 if the multi-variable transmitter 114 comprises an analog output.

It should be appreciated that the temperature sensor 112, the DP sensor 119 and the SP sensor 121 are not inherently redundant. In essence, the disclosed embodiments use three (e.g., PT, SP, DP) sensors that are not in themselves redundant, but by way of the disclosed method, can calculate the saturated steam flow in two ways as discussed herein, thereby providing redundancy for the flow output from the transmitter to its host system. Additionally, the deviation between the flow of saturated steam as calculated from the process temperature and the differential pressure compared to the flow of saturated steam as calculated from the differential pressure and static pressure can indicate a degradation of one or more of these sensors (e.g., temperature sensor 112 or SP sensor 121).

FIG. 6 illustrates a block diagram depicting aspects of the system 100 including the multi-variable transmitter 114, in accordance with an alternative embodiment. The configuration shown in FIG. 6 is similar to the arrangement shown in FIG. 5, with the difference being that FIG. 6 depicts a single pressure sensor that can function as a DP sensor and an SP sensor (i.e., see the DP/SP sensor 123) rather than the separate DP sensor 119 and the separate SP sensor 121 shown in FIG. 5.

It should be appreciated that although a preferred embodiment can be executed in the context of the multi-variable transmitter 114, the disclosed approach can be executed in other devices, such as, for example, an external control computer associated with a host system, a flow computer that is implemented as a field mounted device, and/or in other devices such as an RTU (Remote Terminal Unit), a PLC (Programmable Logic Computer), and a DCS (Digital Control System).

Figure 7:
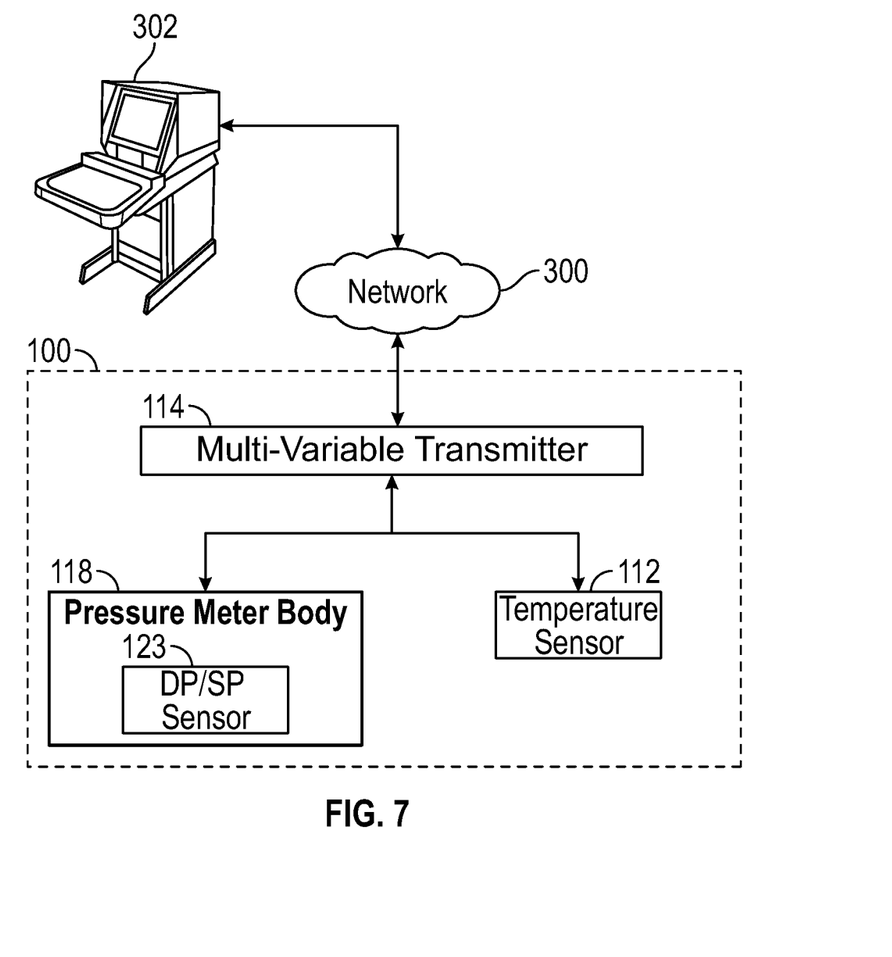
FIG. 7 illustrates a block diagram depicting aspects of a system for measuring flow including a multi-variable transmitter, in accordance with another embodiment.

FIG. 7 illustrates a block diagram depicting aspects of the system 100 for measuring flow including the multi-variable transmitter 114, the pressure meter body 118 (which includes the DP/SP sensor 123), and the temperature sensor 112, in accordance with another embodiment. In the embodiment shown in FIG. 7, the disclosed approach can be implemented in the context of another computing system 302, which is located remote from the system 100, and which can communicate with the multi-variable transmitter 114 through a network 300. The computing system 302 can be, for example, a control system or control computer, which can store in a memory and/or process the various steps, operations or instructions, described herein, and can remotely control the operations and functions of system 100 including its various components such as the multi-variable transmitter 114.

In some embodiments, the network 300 may be a "cloud" network or another type of network (e.g., such as the HART-type networks—wirelesses or wired—that were previously discussed herein). Note that the term cloud network as utilized herein relates to a network based on "cloud computing" which refers to the on-demand availability of computer system resources, particularly data storage and computing power, without the direct active management by a user.

The term "cloud computing" and hence a "cloud network" can be used to describe data centers available to many users over the Internet. Large clouds, predominant today, often have functions distributed over multiple locations from central servers. If the connection to the user is relatively close, it may be designated an edge server, which is an example of an edge device. A "cloud" or "cloud network" may be limited to a single organization (enterprise clouds,) be available to many organizations (public cloud,) or a combination of both (hybrid cloud).

Note that the term "edge device" as used herein can refer to a device that provides an entry point into an enterprise or service provider core networks. Examples include routers, routing switches, integrated access devices (IADs), multiplexers, and a variety of metropolitan area network (MAN) and wide area network (WAN) access devices.

The disclosed embodiments can be deployed in a number of different contexts and environments. As discussed previously, the disclosed approach can be implemented and run in the multi-variable transmitter 114. Running the disclosed method in the multi-variable transmitter 114 can result in a fast evaluation and flow calculation for a single multi-variable transmitter. A trade-off, however, is that this approach may require processing at the lowest level computing engine.

The disclosed approach can alternatively be deployed in the context of an edge device or a data aggregator. An advantage of this type of deployment is that an evaluation for multiple-variable transmitters can be implemented in a given locale. A trade-off in this deployment is a less frequent sampling rate compared to an on-board multi-variable transmitter implementation.

Another potential deployment of the disclosed approach involves an on-premise monitoring system. An advantage of this approach is that an evaluation for multiple multi-variable transmitters can be implemented in multiple locales. A trade-off, however, that may be inherent with this type of deployment, is a less frequent sampling rate as compared to an on-board multi-variable transmitter deployment or an edge device deployment.

Another type of deployment of the disclosed approach can involve off-premise or cloud monitoring systems (e.g., see the prior discussion regarding "cloud computing"). An advantage of this deployment type is that evaluations can be performed for multi-variable transmitters across an enterprise or organization. A trade-off for this type of scenario is that this deployment is dependent on a reliable connection from the off-premise/cloud to the edge device.

It should be further appreciated that the order of the various steps, operations and instructions shown at the various blocks in FIGS. 1-7 herein can be arranged or implemented in a different order or with fewer or more steps, operations and instructions or elements. In other words, the particular ordering of elements shown in FIGS. 1-7 is not a limiting feature of the disclosed embodiments.

As can be appreciated by one skilled in the art, example embodiments can be implemented in the context of a method, data-processing system, or computer program product. The disclosed embodiments can be implemented in for example, an external device or data-processing system (e.g., a computer) or in the multi-variable transmitter 114 itself as shown in the embodiments depicted in FIGS. 5-7. Accordingly, some embodiments may take the form of a hardware embodiment, a software embodiment or an embodiment combining software and hardware aspects generally referred to herein as a "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, and so on.

Computer program code for carrying out operations of the present invention may be written in an object oriented programming language (e.g., Java, C++, etc.). The computer program code, however, for carrying out operations of particular embodiments may also be written in procedural programming languages, such as the "C" programming language or in a visually oriented programming environment, such as, for example, Visual Basic.

The program code may execute on the user's computer, partly on the user's computer, as a stand-alone software package, partly on the user's computer and partly on a remote computer or entirely on the remote computer. In the latter scenario, the remote computer may communicate with the multi-variable transmitter 114, for example, through the network 300, which may be a network such as a LAN (Local Area Network), WAN (Wide Area Network), or a wireless data network (e.g., Wi-Fi, Wimax, 802.xx, and cellular network) or the connection may be made to an external computer via most third party supported networks (for example, through the Internet utilizing an Internet Service Provider).

The disclosed example embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of, for example, a general-purpose computer, a special-purpose computer, or another programmable data processing apparatus to produce a machine, such that the instructions, which execute via the processor of the computer or other programmable data processing apparatus, can create a device or system for implementing the functions/acts specified in the block or blocks.

To be clear, the disclosed embodiments can be implemented in the context of, for example a special-purpose computer or a general-purpose computer, or other programmable data processing apparatus or system. For example, in some example embodiments, a data processing apparatus or system can be implemented as a combination of a special-purpose computer and a general-purpose computer.

In a preferred embodiment, the disclosed method can be run in the context of the multi-variable transmitter 114. In some cases, however, an external control system that includes an external computing device or computing system can use signals transmitted from the multi-variable transmitter 114 to control the setting and operations of the system 100 and the multi-variable transmitter 114, along with control of the various sensing devices such as the DP sensor 119, the SP sensor 121, the temperature sensor 112 and so on. A control computer associated with a host system, for example, located remote from the system 100 may communicate with the multi-variable transmitter 114 via, for example, the communications interface 116 (i.e., wireless or wired) discussed previously.

The aforementioned computer program instructions may also be stored in a computer-readable memory (e.g., such as memory 342 or in another memory such as a memory of a server or control computer associated with a host system) that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the various blocks disclosed herein.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the blocks may occur out of the order noted in the figures. For example, two blocks shown in succession may, in fact, be executed concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special purpose hardware and computer instructions.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" can include a software application, but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular data type. Modules may be composed of two parts: an interface, which lists the constants, data types, variable, and routines that can be accessed by other modules or routines, and an implementation, which may be private (accessible only to that module) and which can include source code that actually implements the routines in the module. The term module may also simply refer to an application, such as a computer program designed to assist in the performance of a specific task, such as word processing, accounting, inventory management, etc. In some example embodiments, the term "module" may also refer to a modular hardware component or a component that is a combination of hardware and software. Examples of modules can include the various elements discussed and described herein. A module or group of modules can implement the various elements, blocks, instructions, steps and/or operations described herein.

FIGS. 5-6 are thus intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms.

The embodiments may be an apparatus, a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A system for measuring a flow of saturated steam, comprising:
    a temperature sensor that measures a process temperature; and
    at least one pressure sensor that measures pressure including a differential pressure and a static pressure, wherein two sets of measurements are used to calculate a flow of saturated steam, wherein a first set of measurements among the two sets of measurements uses the differential pressure and the static pressure to calculate the flow of saturated steam and a second set of measurements among the sets of measurements uses the differential pressure and the process temperature to calculate the flow of saturated steam, wherein the system is configured to provide redundant flow measurements with respect to the flow of the saturated steam in case of a failure of either the temperature sensor or the static pressure sensor.

2. The system of claim 1 wherein a deviation between a flow of the saturated steam as calculated from the process temperature and the differential pressure compared to a flow of the saturated steam as calculated from the differential pressure and the static pressure provides an indication of a degradation of at least one of: the temperature sensor and the at least one pressure sensor.

3. The system of claim 2 wherein the deviation comprises an early indicator for calibration of either the temperature sensor or the at least one pressure sensor.

4. The system of claim 1 wherein a quality status regarding which of the redundant flow measurements is output with respect to the flow of the saturated steam.

5. The system of claim 1 wherein a quality status is output regarding:
    the differential pressure and the process temperature measured to calculate the flow of the saturated steam; and
    the differential pressure and the static pressure measured to calculate the flow of the saturated steam.

6. The system of claim 1, further comprising:
    a multi-variable transmitter;
    a field mounted device;
    an RTU (Remote Terminal Unit);
    a PLC (Programmable Logic Controller); and
    a DCS (Digital Control System).

7. A system for measuring a flow of saturated steam, the system comprising:
    at least one processor; and
    a non-transitory computer-usable medium embodying computer program code, the computer-usable medium capable of communicating with the at least one processor, the computer program code comprising instructions executable by the at least one processor and configured for:
        measuring a process temperature with a temperature sensor; and
        measuring with at least one pressure sensor located in a pressure meter body, a pressure including a differential pressure and a static pressure, wherein the temperature sensor and the at least one pressure sensor provide two sets of measurements to calculate a flow of saturated steam,
        computing a first set of measurements among the two sets of measurements using the differential pressure and the static pressure provided by the at least one pressure sensor to calculate a first computed flow of saturated steam,
        computing a second set of measurements among the two sets of measurements using the differential pressure provided by the at least one pressure sensor and the process temperature provided by the temperature sensor to calculate a second computed flow of saturated steam,
        comparing and determining a deviation between the first computed flow of saturated steam and the second computed flow of saturated steam corresponding to the two sets of measurements, and
        evaluating the deviation between the first and the second flows of saturated steam to determine failure of either the temperature sensor or the static pressure sensor,
        wherein the system is configured to provide output redundant first and second flows of the saturated steam in case of the failure of either the temperature sensor or the static pressure sensor.

8. The system of claim 7 wherein the instructions are further configured for providing an indication of a degradation of at least one of: the temperature sensor and the at least one pressure sensor, based on the deviation.

9. The system of claim 8 wherein the deviation comprises an early indicator for calibration of either the temperature sensor or the at least one pressure sensor.

10. The system of claim 7 wherein a quality status regarding which of the redundant flow measurements is output with respect to the flow of the saturated steam.

11. The system of claim 7 wherein a quality status is output regarding:
    the differential pressure and the process temperature measured to calculate the flow of the saturated steam; and
    the differential pressure and the static pressure measured to calculate the flow of the saturated steam.

12. The system of claim 7, further comprising:
    a multi-variable transmitter;
    a field mounted device;
    an RTU (Remote Terminal Unit);
    a PLC (Programmable Logic Controller); and
    a DCS (Digital Control System).

13. A method for measuring a flow of saturated steam, comprising the steps of:
    measuring a process temperature with a temperature sensor; and
    measuring with at least one pressure sensor, a pressure including a differential pressure and a static pressure, wherein two sets of measurements are used to calculate a flow of saturated steam, wherein a first set of measurements among the two sets of measurements uses the differential pressure and the static pressure to calculate the flow of saturated steam and a second set of measurements among the sets of measurements uses the differential pressure and the process temperature to calculate the flow of saturated steam, wherein redundant flow measurements are provided with respect to the flow of the saturated steam in case of a failure of either the temperature sensor or the static pressure sensor.

14. The method of claim 13 further comprising a step of: determining a deviation between a flow of the saturated steam as calculated from the process temperature and the differential pressure compared to a flow of the saturated steam as calculated from the differential pressure and the static pressure provides an indication of a degradation of at least one of: the temperature sensor and the at least one pressure sensor.

15. The method of claim 14 wherein the deviation comprises an early indicator for calibration of either the temperature sensor or the at least one pressure sensor.

16. The method of claim 13 further comprising a step of generating a quality status regarding the redundant flow measurements with respect to the flow of the saturated steam.

17. The method of claim 13 further comprising a step of: generating a quality status regarding the differential pressure and the process temperature measured to calculate the flow of the saturated steam.

18. The method of claim 13 further comprising a step of: generating a quality status regarding the differential pressure and the static pressure measured to calculate the flow of the saturated steam.

19. The method of claim 13 further comprising a step of: generating a quality status regarding:

the differential pressure and the process temperature measured to calculate the flow of the saturated steam; and the differential pressure and the static pressure measured to calculate the flow of the saturated steam.

20. The method of claim 13 wherein the step of measuring the process temperature with the temperature sensor and the step of measuring with the at least one pressure sensor, the pressure including the differential pressure and the static pressure, are performed in:

a multi-variable transmitter;

a field mounted device;

an RTU (Remote Terminal Unit);

a PLC (Programmable Logic Controller); or a DCS (Digital Control System).

* * * * *